United States Patent Office 3,289,820
Patented Dec. 6, 1966

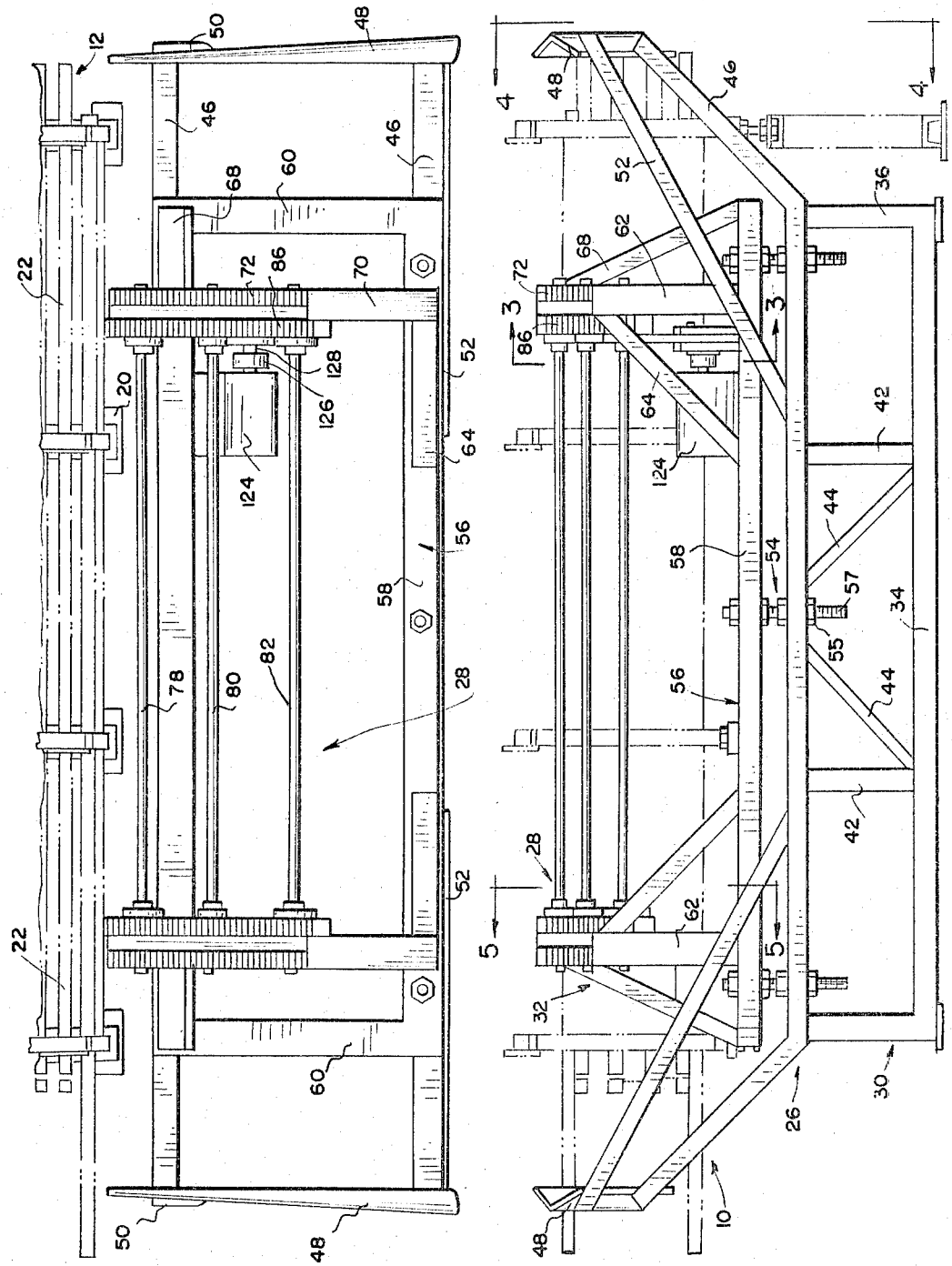

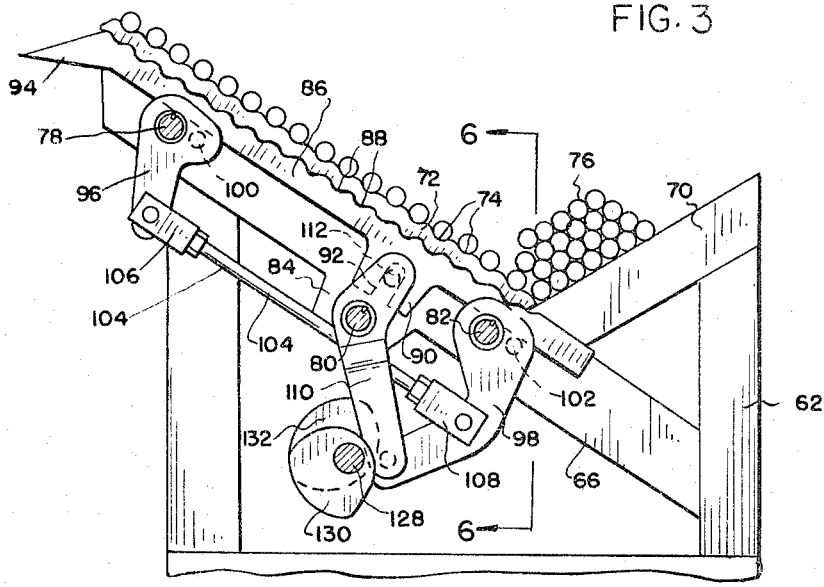
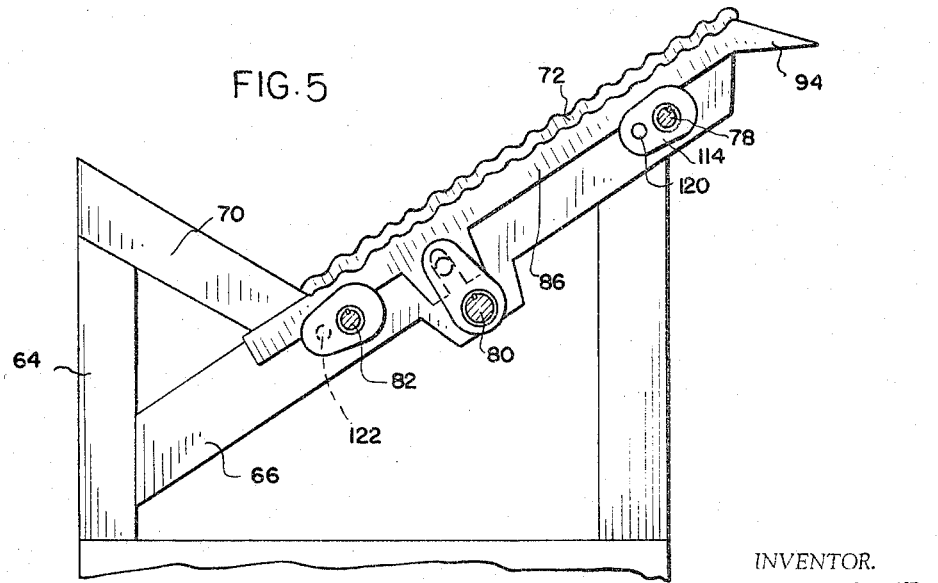

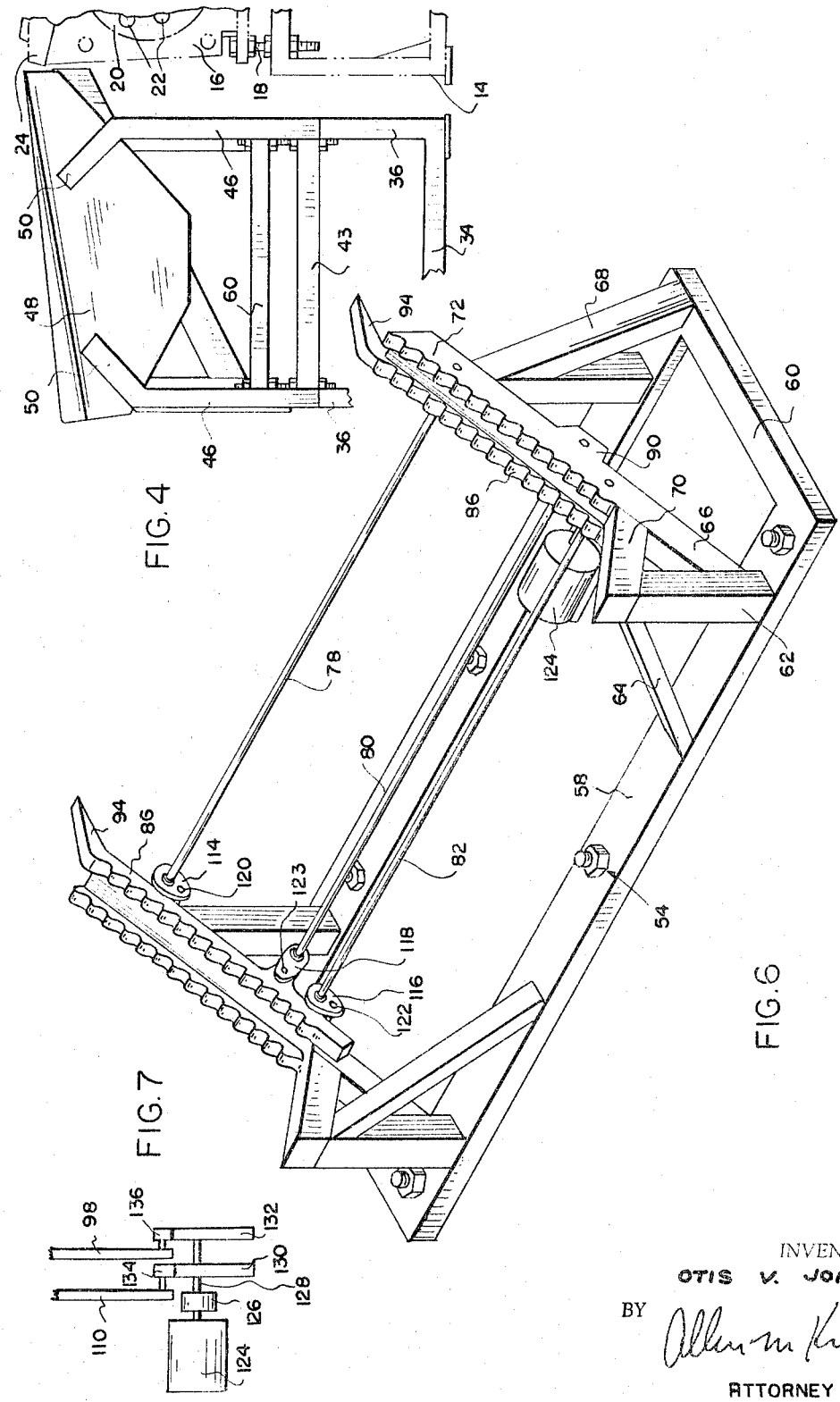

3,289,820
BUNDLE FEED AND ORIENTATION SYSTEM
Otis V. Jones, Jr., Dearborn, Mich.
(18533 Weaver, Detroit, Mich.)
Filed Sept. 21, 1964, Ser. No. 397,942
4 Claims. (Cl. 198—219)

This invention relates to a conveyor device for feeding elongated members or bars singly and in proper orientation from a plurality or bundle of such bars. More particularly the invention has a reference to a device for supplying bars one at a time in parallel fashion to a stock feeding apparatus employed as a loader for multi-spindle metal working machines.

In my copending application, Serial No. 71,622, now Patent No. 3,147,653, and my Patent No. 3,010,605, issued November 28, 1961, a loading system for multiple-spindle machines is disclosed wherein bar stock is sequentially fed into a plurality of tubes from which they are loaded into the collets of the serviced multiple spindle machine. In stock-loading apparatus of this kind, the bar stock must be provided in a single layer and in a limited number. It is, therefore, desirable to provide automatic feeding means for maintaining a fixed minimum number of parallel bars in storage position in the stock loading apparatus at all times.

The difficulty encountered in providing a feeding system for stock loading apparatus of this kind resides in the fact that bar stock is ordinarily shipped and transported in bundle wherein the individual bars are skewed relative to one another. As a result, the feed system must be capable of orienting the bars as well as removing them from their bundle and feeding them to the stock loading apparatus.

The present invention contemplates a bundle-feed device of this kind wherein the bars are placed in the machine in the form of a bundle or pile, and the individual bars are simultaneously separated from the bundle and properly oriented, and subsequently are delivered to the desired destination in their properly oriented condition.

In a preferred embodiment of the invention which will be subsequently described in greater detail, the present bundle feed and orientation system comprises a pair of parallel inclined feed tables mounted at opposite ends of an adjustable frame structure. Each table includes a fixed plate with parallel grooves across its upper surface and a cam-actuated similarly grooved feed plate. The latter member undergoes a "walking motion" when actuated, thereby moving from below the fixed plate to a position above that member, and then moving upwards along the table surface, downwards below the fixed plate, and finally returning to its initial position. The result of this "walking motion" is to lift the bars disposed in the corresponding grooves of the opposite fixed plates, shifting them upwards along the table surface, and depositing them in the groove in the fixed plate just above the starting groove. The bars are moved upwards in this manner until they are finally rolled off the upper end of the table into the stock loading apparatus.

The feed plate also prevents the bars moved up the table from being skewed; any bar skewed from the desired orientation is displaced from its position in the grooves in the fixed plate by the feed plate and consequently falls back to the bundle below or to an acceptable orientation in the grooves below.

The cams are rotated by a motor which may be actuated by an appropriate signal from the stock loading machine when the supply of bars in the latter apparatus is reduced below a preset minimum.

It is therefore the primary object of the present invention to provide feed system adapted to feed individual pieces in proper orientation from a bundle of elongated members or bars.

A further object is to provide a system of this kind wherein the elongated members or bars are fed by a walking motion along an inclined plane and undesirably skewed bars are displaced by this motion and allowed to fall back to their initial position in the bundle.

Another object is to provide a loading system of this kind which is actuated by at least one cam rotated by a motor which in turn may be actuated by a signal from the loaded structure.

Still another object is to provide a bundle feed and orientation system of this kind which is extremely simple in structure and operation, and hence is economical to manufacture, convenient to repair and reliable in operation.

Other objects and advantages of the invention will be more readily apparent from the following detailed description of a preferred embodiment thereof. The description makes reference to the drawings in which:

FIG. 1 is a rear elevational view of a preferred embodiment of the invention, with a stock loading apparatus shown in phantom lines;

FIG. 2 is a top plan view of the structure shown in FIG. 1;

FIG. 3 is a sectional view, taken along the lines 3—3 in FIG. 1;

FIG. 4 is a side elevational view taken along the lines 4—4 in FIG. 1;

FIG. 5 is a sectional view taken along the lines 5—5 in FIG. 1;

FIG. 6 is a sectional view taken along the lines 6—6 in FIG. 3; and

FIG. 7 is a perspective view of the present bundle feed and orientation system.

Referring to the drawing in detail, FIGS. 1, 2 and 4 show the present bundle feed device 10 positioned adjacent to a stock loading machine 12 (indicated in phantom lines) which is adapted to feed bar stock into a conventional multiple and single spindle machine (not shown) such as an automatic screw machine. The stock loading apparatus 12 is of the type disclosed in my application, Serial No. 71,622 and my Patent No. 3,010,605, issued Nov. 28, 1961, and includes a base 14, and an upper housing 16 supported on the base along vertically adjustable screws 18. The housing 16 includes a rotatable reel 20 having a plurality of tubes 22 therein, and an upper loading platform 24 upon which the bar stock is placed preparatory to being fed one at a time into the tubes 22. The tubes are adapted to move the bars axially into the collets (not shown) of an adjacent multiple spindle metal working machine.

The bundle feed system 10 generally comprises a supporting frame structure indicated at 26 and a feed mechanism indicated at 28. The supporting frame structure 26 includes a fixed bed 30 and an adjustable upper frame 32 mounted upon the bed.

The bed 30 comprises a horizontal rectangular base 34 constructed of conventional framing members of metal or wood, and vertical corner posts 36 mounted at each of the four corners of the base 34. A pair of channel-shaped frames 38 are supported on the corner posts 36. Each frame includes a horizontal longitudinal beam 40 which extends along a longitudinal side of the bed 30 and is supported at each end by one of the corner posts 36. Intermediate posts 42 also support each frame 38, extending between the base 34 and the beam 40. Struts 44 extend diagonally between the lower ends of the posts 42 and the beam 40. Lateral beams 43 extend between the longitudinal beams 40 at the shorter sides of the bed 30.

Each frame 38 also includes a centering plate support 46 extending upwards away from the supporting frame 26 at the ends of the longitudinal beams 40. A centering plate 48 lying in the vertical plane, is fixed to the upper inwardly bent ends 50 of the plate supports at each end of the machine. Diagonal stiffners 52 extend between the beam 40 and the centering plate 48 at the front of the frame structure 26 so as to provide additional support for the plates.

The adjustable upper frame 32 is supported on the bed 30 by means of adjustable heavy jack screws 54 which connect the beam 40 of the bed 30 to a horizontal rectangular frame platform 56 at the lower portion of the upper frame 32. This platform 56 is of the same general configuration as the longitudinal and lateral beams 40 and 43 and is parallel to those members. The platform comprises horizontal longitudinal beams 58 and connecting lateral beams 60.

The bundle feed mechanism 28 is supported in the upper frame 32. A pair of vertical posts 62 are fixed upon the longitudinal beam 58 at the front of the platform 56. Front braces 64 support the posts 62 in position on the platform. A sloping feed table 66 extends between the lower part of each post 62 and the upper end of a rear brace 68 supported at the rear corner of the platform 56. An inclined shelf 70 is fixed at the upper end of each post 62 and slopes downwardly into abutment with the feed table 66 as shown in FIG. 3.

A rest plate 72 is fixed along the upper surface of each feed table 66 between its upper end and the abutting shelf 70. Each rest plate 72 includes semi-circular grooves 74 adapted to receive the bars 76, shown in phantom lines in FIG. 3. The grooves 74 in the rest plates 72 are aligned so that a bar extending between a pair of grooves is held in a horizontal position, parallel to the length of the machine.

Parallel rods 78, 80 and 82 are rotatably supported at their ends in bearings located respectively at the upper end of each feed table 66, a projecting rod support 84 at the midportion of each table, and in each table at a point adjacent the abutting shelf 70.

A feed plate 86 disposed parallel to each rest plate 72 and extending adjacent the feed table 66, is supported in a manner which will be subsequently described. Each feed plate includes semi-circular grooves 88 along its upper surface of the same size and configuration as the grooves 74 in the rest plate 72, a transversely projecting flange 90 having a pin slot 92 therein, and a projecting tapered lip 94 at its upper end. The lip slopes slightly downwards along its upper surface.

A pair of lift levers 96 and 98 are fixed respectively to the upper and lower rods 78 and 82 adjacent their right ends as viewed in FIG. 2. The lower lever 98 is substantially longer than the upper lever 96. Both levers 96 and 98 include rotatably mounted lift pins 100 and 102 which extend horizontally and support the adjacent feed plate 86. A connecting rod 104 is fixed at each of its ends in a rod mounting 106 and 108 which is pivotably supported on the adjacent lift lever 96, 98. The rod mounting 106 at the upper lift lever 96 is mounted at the midportion of the lower lift lever 98. The connecting rod thus fixes the two levers 96 and 98 together so that a rotation of either of the levers 96 and 98 about the axis of its adjoining rod will be transmitted to the opposite lever. The lift levers 96 and 98 are fixed together in this manner with their respective lift pins 100 and 102 in the same position relative to the adjacent lower surface of the feed plate 86.

A shift lever 110 is fixed at its midportion to the central rod 80 adjacent the lift levers 96 and 98. The upper lever arm of the lever 110 includes a journaled pin 112 which fits slidingly in the slot 92 on the flange 90 of the feed plate 86.

At the left end of the machine, as illustrated in FIG. 5, the rods 78, 80 and 82 are fixed to lift levers 114 and 116 and a shift lever 118. These latter members are substantially the same as the upper portion of each of the corresponding levers 96, 98, and 110. The lift levers 114 and 116 and the shift lever 118 include journaled lift pins 120 and 122 and a shift pin 123 which operate with respect to the adjacent feed plate 86 in the same manner as those at the right end of the machine shown in FIG. 3.

A motor 124 is mounted on the adjacent upper frame 32 adjacent the right end of the machine. The output of the motor is connected to a speed reducer 126 which in turn rotates a shaft 128. A pair of cams 130 and 132 are fixed at spaced points upon the shaft 128. Rotation of the shift cam 130 is sensed through the journaled cam follower 134 at the lower end of the shift lever 110. A second cam follower 136 is journaled in the lower end of the lift lever 98 and bears against the lift cam 132.

The respective cam profiles of cams 130 and 132 are such that the motions imparted to the feed plate 86 comprises a lifting motion whereby the upper surface of the feed plate is raised above the surface of the rest plate 74, a shifting motion translating the feed plate along the feed table towards the upper end thereof, a lowering motion whereby the upper surface of the feed plate is lowered below the surface of the rest plate 74, and a return shifting motion bringing the feed plate back to its original position.

These motions are accomplished in the following manner. When the lobe of the lift cam 132 bears against the cam follower 136, the lift lever 98 and its rod 82 are rotated; the connecting rod 104 causes the upper lift lever 96 and rod 78 to undergo the same rotational motion. This rotation causes both the lift pins 100 and 102, bearing against the lower surface of the feed plate 86, to lift the feed plate in the direction perpendicular to its length until the grooves 88 of the feed plate are situated above the grooves 74 of the rest plate 72. The rods 78 and 82 cause the lift levers 114 and 116 and feed plate at the left end of the machine to undergo the same motion.

When the lobe of the lift cam 132 is in the position described above, the dwell portion of the shift cam 130 bears against the cam follower 134. This causes the shift levers 110 and 118 to retain the feed plates 86 in their rearward or downward position. In this position, the grooves 88 are aligned with the grooves 74 in the plane perpendicular to the feed table 66 and the uppermost groove in the rest plate 72 is aligned with the upper surface of the lip 94.

As the shaft 128 is further rotated, the lobe of the lift cam 132 continues to maintain the feed plate 86 in its raised position, while the lobe of the shift cam 130 beings to bear against the cam follower 134 causing the shift levers 110 and 118 to rotate. This latter motion causes the shift pins 112 and 123 to rotate about the axis of the rod 80 and shifts the feed plates 86 upwards along the feed tables 66. The magnitude of this linear movement is equal to the distance between the adjacent grooves 74 or 88. At the termination of this motion, therefore, the grooves 74 and 88 are still in alignment but the uppermost groove in the rest plate is now in alignment with the uppermost groove in the feed plate.

Further rotation of the shaft 128 causes the lobe of the shift cam to continue to hold the feed plates in their upper or forward position; at the same time the dwell portion of the lift cam 132 abuts the follower 136, causing the feed plates to move to their lower position wherein the surface of each feed plate is disposed below that of the adjacent rest plate. FIGURE 3 shows the feed plate 86 in this position.

As the shaft 128 continues to rotate, the dwell portion of the lift cam 132 continues to maintain the feed plate 86 in its lowered position; at the same time, the dwell portion of the shift cam 130 abuts the follower 134, causing the feed plates to shift rearwardly to their starting positions. This completes the walking beam motion of the feed plate.

When the bars 76 are placed in the machine, the ends of the bars are supported in the concavities formed by the intersection of the shelves 70 and the tables 66. The centering plates 48 limit the projection of the bars beyond the ends of the machine.

Actuation of the motor 124 causes the feed plate 86 to rise, shift towards the upper end of the tables 66 and then return to their initial position. This walking motion causes grooves 88 on the feed plates 86 to engage bars 76 in the bundle disposed between the shelf 70 and the table 66, and to transport these bars to a higher groove 74 on the rest plate 72. Continuation of this "walking beam motion" of the feed plate 86 moves the bars to successively higher grooves 74 on the rest plate.

Further actuation of the feed plate 86 after a bar has reached the uppermost groove 74 in the rest plate 72 causes the upper surface of the lip 94 to strike the bar; since the upper surface of the lip 94 is sloped downwardly, the bar will roll downwards off of the lip and into the adjacent stock loader 12.

The grooves in the rest and feed plates are proportioned so that a bar carried along the tables 66 must be situated in corresponding horizontally aligned grooves in the opposing rest plates or at most be skewed one groove out of this condition. A bar which is skewed more than one groove from a true horizontal position is struck by the ridges between the grooves 88 on the feed plate 86 as the latter member is actuated, and consequenly falls back to the pile of bars below, or to a position in the grooves 74 below which is either horizontal or skewed one groove away from the horizontal. Thus, every bar carried up the feed table must be either horizontal or, at most, be skewed from the horizontal a distance equal to the distance between adjacent grooves. If it is skewed more than this, it will be displaced by the feed plate and will fall back to the bundle below by the force of gravity.

If a bar is carried to the top of the feed table 66 skewed one groove from the horizontal, the lip 94 on the feed plate 86 displaces the bar, causing it to roll downward along the lip into the stock loading apparatus; the bar will substantially align itself with the horizontal during this rolling period, thus feeding a properly aligned bar into the stock loading machine.

It can be seen that the first row or layer of bar stock on the feed table 66 will lie in the grooves 74 of the rest plate 72. Any bars deposited as a second tier or layer upon these first bars will necessarily each be supported upon two of the bars in the first tier. The slope of the feed table 66 is such that the vertical axis or plane of any second tier bar will be disposed rearwardly (downhill) of the vertical axis or plane of the lowermost first tier bar upon which it rests. As a result, the second tier bar will be unstable and will fall back to the bundle below. Thus the present bundle feed restricts the bars ascending the feed table to a single tier and thereby controls the number of bars fed at all times.

The stock loading apparatus may be provided with detecting and signaling equipment to detect the number of bars in storage position in the loader and to transmit a signal to the bundle feed mechanism when the number of stored bars is reduced below a present minimum. This signal may be adapted to actuate the motor 124 until enough bars have been fed by the bundle feed into storage position in the stock loader.

The stock loading apparatus is vertically adjustable by means of the supporting screws 18 so that it may be used with multiple spindle machines of various heights. The present bundle feed apparatus is similarly adjustable vertically by means of the jack screws 54 between the fixed bed 30 and the adjustable upper frame 32.

Although the present bundle feed apparatus has been shown as a machine adapted to feed a stock loading device for multiple spindle machines, it can be seen that the present device may be employed in a variety of applications wherein elongated members must be fed one at a time in a desired orientation from a bundle or pile of such members, the latter being normally not disposed in the desired alignment.

Having thus described my invention, I claim:

1. A feed and orientation system for a plurality of elongated members, comprising:

a frame;

a pair of inclined feed tables in said frame, said elongated members being normally stored in lateral abutment with said table at a location below the uppermost end thereof;

a fixed plate on each of said tables between said stored members and said uppermost end, having spaced grooves thereon adapted to receive said members;

power means in said frame;

a pair of cams actuated by said power means;

a lift lever on each of said tables, the lever on one of said tables being actuated by the first cam;

a shift lever on each of said tables, the lever on one of said tables being actuated by the second cam;

separate rod means connecting said lift levers and connecting said shift levers, whereby said cams actuate the levers on both tables simultaneously and in similar fashion;

and a feed plate in each of said tables having grooves corresponding to those of said fixed plate and adapted to be moved in the direction perpendicular to the inclination of said table by the adjacent lift lever and in the direction parallel to said inclination by the adjacent shift lever, and adapted thereby to move said elongated members from storage position to a successively higher groove in said fixed plate with each actuation of said levers and to thereby feed the elongated member in the the uppermost groove in said fixed plate to a point external of the system.

2. A feed system for a plurality of elongated members, comprising:

a supporting frame structure;

a vertically adjustable upper frame on said structure;

a pair of inclined feed tables in said frame, said elongated members being normally stored in abutment with said table at a location below the uppermost end thereof;

a fixed plate on each of said tables between said stored members and said uppermost end, having spaced grooves thereon adapted to receive said members;

power means in said frame;

a pair of cams actuated by said power means;

a pair of lift levers on each of said tables, one of the levers on one of said tables being actuated by the first cam;

a shift lever on each of said tables, the lever on one of said tables being actuated by the second cam;

a connecting rod adapted to connect said actuated lift lever with the second lift lever in that table;

first rod means connecting the corresponding lift levers in the opposing feed tables;

second rod means connecting the shift levers in the feed tables;

and a feed plate in each of said tables having grooves corresponding to those of said fixed plate and adapted to be moved in the direction perpendicular to the inclination of said table by the adjacent lift levers and in the direction parallel to said inclination by the adjacent shift lever, and adapted thereby to move said elongated members from storage position to a successively higher groove in said fixed plate with each actuation of said levers and to thereby feed the elongated member in the uppermost groove in said fixed plate to a point external of the system.

3. The structure set forth in claim 2 including a pair of spaced-apart centering plates mounted parallel to said feed tables on said frame structure and adapted to maintain said elongated members in centered position on said fixed plates.

4. A bundle feed and orientation system for a multiple spindle machine bar stock loading device, comprising:
- a supporting frame structure;
- a vertically adjustable upper frame on said structure;
- a pair of inclined feed tables in said frame, said bars being normally stored in lateral abutment with the upper surface of said table at a location below the uppermost end thereof;
- a fixed plate on each of said tables between said bars and said uppermost end, having spaced grooves thereon adapted to receive said members;
- a pair of inclined feed tables in said frame said elongated members being normally stored in lateral abutment with said table at a location below the uppermost end thereof;
- a fixed plate on each of said tables between said stored members and said uppermost end, having spaced grooves thereon adapted to receive said members;
- power means in said frame;
- a pair of cams actuated by said power means;
- a pair of lift levers on each of said tables, one of the levers on one of said tables being actuated by the first cam;
- a shift lever on each of said tables, the lever on one of said tables being actuated by the second cam;
- a connecting rod adapted to connect said actuated lift lever with the second lift lever in that table;
- first rod means connecting the corresponding lift levers in the opposing feed tables;
- second rod means connecting the shift levers in the feed tables;
- and a feed plate in each of said tables having grooves corresponding to those of said fixed plate, and a lip at its uppermost and sloping downwardly away from said table, said feed plate adapted to be moved in the direction perpendicular to the inclination of said table by the adjacent lift levers and in the direction parallel to said inclination by the adjacent shift lever, and adapted thereby to move properly oriented bars from storage position to successively higher grooves in said fixed plate with each actuation of said levers, improperly oriented bars being displaced by the ridges between adjacent grooves in said feed plate so as to fall towards said storage position, and to thereby cause said lip to displace the bar in the uppermost groove in said fixed plate from its position therein whereby said bar is moved by gravity along said lip to a point in said stock loading device.

References Cited by the Examiner

UNITED STATES PATENTS

| | | | |
|---|---|---|---|
| 1,686,696 | 2/1927 | Hirschmann | 198—218 |
| 2,995,235 | 8/1961 | Maier | 198—29 |

EVON C. BLUNK, *Primary Examiner.*

R. E. KRISHER, A. C. HODGSON, *Assistant Examiners.*